Patented Apr. 28, 1925.

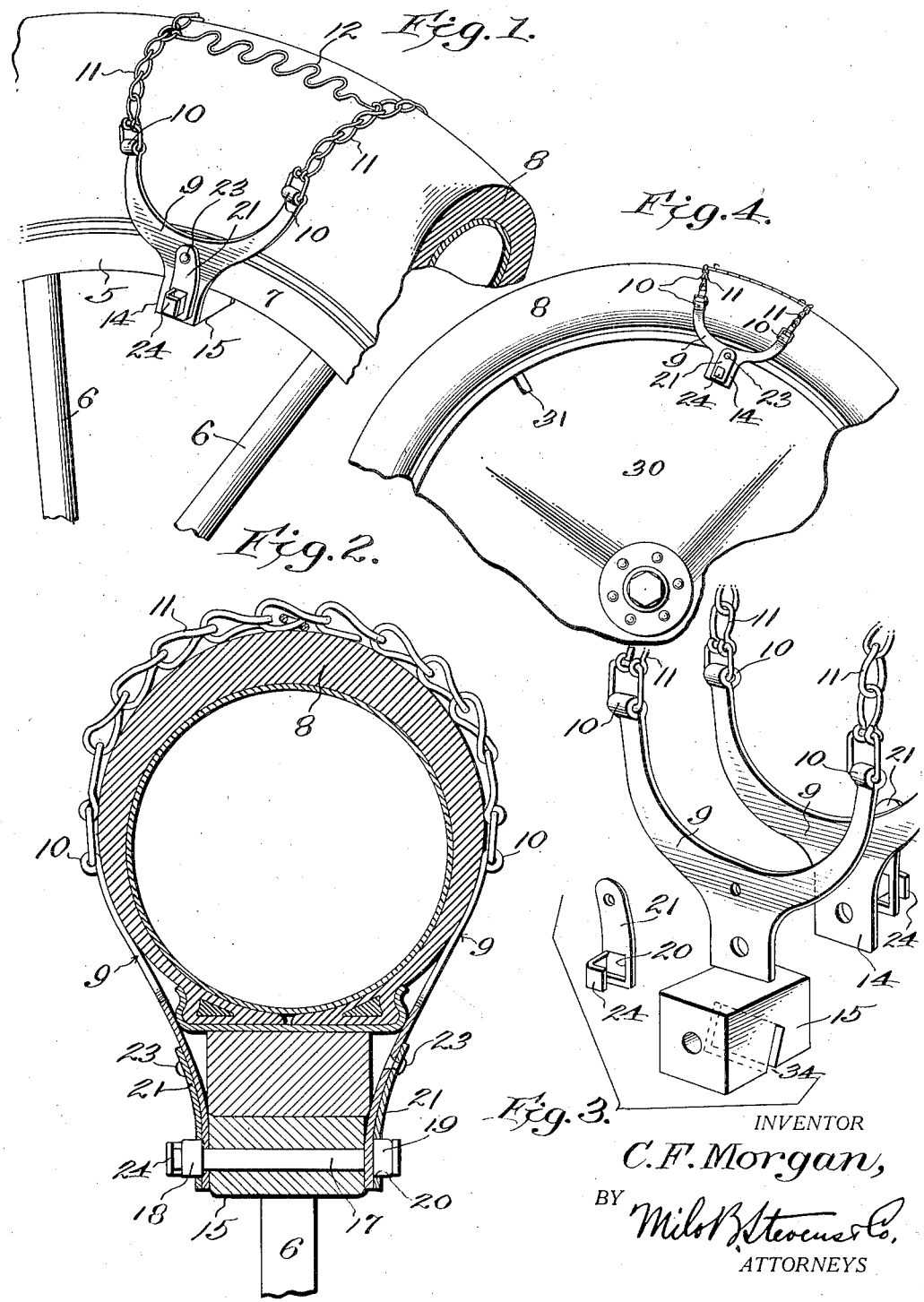

1,535,620

UNITED STATES PATENT OFFICE.

CHESTER F. MORGAN, OF MOUNT VERNON, ILLINOIS.

ANTISKID DEVICE.

Application filed August 19, 1924. Serial No. 732,978.

*To all whom it may concern:*

Be it known that I, CHESTER F. MORGAN, a citizen of the United States, residing at Mt. Vernon, in the county of Jefferson and State of Illinois, have invented new and useful Improvements in Antiskid Devices, of which the following is a specification.

This invention relates to anti-skid devices especially adapted for use on motor vehicle wheels.

Briefly stated, an important object of this invention is to provide an anti-skidding device having simple and convenient means whereby the same may be applied to a vehicle wheel without aid of a number of tools and without the exercise of unusual skill.

A further object is to provide an anti-skid device designed to prevent circumferential and lateral slipping of the wheel.

A further object is to provide a non-skid device which is of highly simplified construction, durable in use and cheap to manufacture.

Other objects and advantages will be apparent during the course of the following description.

In the accompanying drawing forming a part of this application and in which like numerals are employed to designate like parts throughout the same.

Figure 1 is a perspective illustrating the application of the device;

Fig. 2 is a detailed transverse sectional view through the non-skid device applied;

Fig. 3 is a group perspective illustrating a slight modification of the invention for use in connection with disk wheels;

Fig. 4 is a fragmentary side elevation of a disk wheel equipped with the form of invention illustrated in Fig. 3.

In the drawings wherein for the purpose of illustration is shown a preferred embodiment of the invention, numeral 5 generally designates a wheel having spokes 6, a felly 7 and a tire 8 of any desired construction.

The invention forming the subject matter of this application is especially adapted for preventing circumferential and lateral skidding of the wheel and to this end I provide a pair of more or less arcuate side plates 9, the ends of which are rolled as indicated at 10 for connection with cross chains 11.

The cross chains 11 are adapted to extend entirely across the tire and a longitudinal traction member 12 is connected at its ends to the intermediate portions of the cross chains 11. Fig. 1 illustrates that the longitudinal traction member is in the nature of a serpentine body of metal or the like and is adapted to contact with the ground to provide the desired traction.

Fig. 3 illustrates that the intermediate portions of the arcuate side plates 9 are provided with apertured ears 14 between which a spacing block 15 is arranged.

Fig. 2 illustrates that the bolt 17 is extended through the block 15 and the ears 14 and is engaged by a nut 18 of any suitable type. The head 19 of the bolt 17 is extended through a squared opening 20 in a locking plate 21 preferably of metal. The locking plate 21 is pivotally connected to one of the side members 9 as indicated at 23 and when it is swung over the head 19 the head is received in the opening 20 and an L-shaped member 24 is positioned over the head. It will be seen that the bolt 17 is positively held against turning without the aid of wrenches or similar devices.

The nut 18 is in turn engaged by one of the plates 21 and more particularly the nut is received in the opening 20 of the plate 21 so as to hold the nut against accidental turning. The L-shaped cover plate 24 not only forms a means for protecting the nut and holding the same against turning but also forms a means whereby the spring plate 21 may be swung outwardly when it is desired to remove the same from engagement with the nut. In other words the L-shaped member 24 acts as a combined gripping member and nut engaging device.

The invention may be carried out in connection with a disk wheel 30 by forming the disk with a plurality of spaced openings 31 for the reception of the block 15 which is preferably of rubber or other yieldable material. The block 15 in Figs. 3 and 4 is provided with a transverse opening 34 for the reception of one edge portion of the wall of the opening 31 so that the block is securely and positively held in position.

The invention forming the subject matter of this application may be quickly applied to a motor vehicle wheel and it is understood that any desired number of traction devices may be placed about the wheel. When in place the improved traction device securely and positively holds the wheel against lateral and circumferential skidding and it is important to note that the device will not wear rapidly.

When it is desired to remove the device it is merely necessary to detach the nut 18 and remove the bolt 17 whereupon the side members 7 may be removed.

The device occupies but a small amount of space in the car and as each device is separate in itself the same may be applied to any desired portion of the wheel without the necessity of first turning the wheel to the proper point or laying chains out straight as in the case of anti-skid devices now on the market.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed is:

1. A non-skid device comprising a pair of side plates, cross chains connected at their ends to said side plates, a circumferentially extending serpentine traction member connected at its ends to the intermediate portions of said chains, and means to secure the side plates to a wheel.

2. A device of the character described comprising a pair of side plates adapted to be arranged at opposite sides of a tire and having outwardly extending longitudinally curved arms, the terminal portions of which are provided with attaching means, anti-skid devices connected to the attaching means of said arms, and a bolt extending through the plates to connect the same.

In testimony whereof I affix my signature.

CHESTER F. MORGAN.